United States Patent Office 2,956,862
Patented Oct. 18, 1960

2,956,862
PROCESS FOR REDUCTION OF CHEMICAL COMPOUNDS

Stuart Schott and Virgil L. Hansley, Cincinnati, Ohio, assignors to National Distillers and Chemical Corporation, a corporation of Virginia No Drawing. Filed June 1, 1956, Ser. No. 588,638

8 Claims. (Cl. 23—209)

This invention relates to a new process and useful improvements therein for the reduction of reducible chemical compounds to produce elements having only one valence that is, single valent elements and also for reduction of reducible chemical compounds of multivalent elements in which the element has its lowest valence, that is, the first valence above the element in free form. More particularly, it relates to improvements in the reduction with alkali metals of compounds of elements having only one normal valence and to the subsequent step whereby the reaction product from the reduction step is agglomerated and/or converted to sponge and/or crystals in more or less massive form.

In processes for producing these elemental materials various of the corresponding derivatives and compounds are reduced in processes using a variety of materials as reducing agents. The usual methods for reducing, for instance, the halides of the elements by alkali metals, are carried out in the presence of amounts of the reducing agent such as the alkali metal at least sufficient for stoichiometric reduction. Generally, they are actually carried out at relatively high temperatures at least above the melting point of the by-product salt in which the reduction takes place in a melt or in a fused reaction medium in which the alkali metal reducing agent is present in substantial excess. For instance, beryllium is manufactured by reduction of the fluoride with magnesium metal in the presence of the molten magnesium fluoride produced as a by-product. Similarly, the Kroll process for titanium employing reduction of titanium tetrachloride with magnesium metal is carried out at temperatures of 850-900° C., which is well above the melting point of the magnesium chloride by-product. Similarly, sodium may be used as the reducing metal for reduction of titanium tetrachloride in which case the reduction is carried out in the presence of the molten sodium chloride by-product.

Under such violent reaction conditions, by-product salts become more or less completely surrounded or encased in the final product, so that aqueous leaching operations are difficult or impractical. Drainage may be used to remove the bulk of the salt by-product while still molten but even after this, the drained product mass contains substantial portions of residual salt occluded therein which must be leached out, distilled away, or otherwise removed. It may be necessary to carry out complete volatiliation of the residual by-product halides and excess reducing agent from the product using high temperature and high vacuum. An alternate to such volatilization is the use of extensive leaching operations with relatively strong acids, such as nitric acid and/or hydrochloric acid provided the final product can withstand such treatment without substantially altering its chemical and physical properties. For example, in the process for reduction of beryllium fluoride by magnesium metal it is necessary to leach the product with ammonium hydrogen fluoride in order to remove completely the beryllium fluoride and magnesium fluoride. This is an extremely expensive and bothersome procedure to follow and renders the process unattractive for commercial production of the extremely valuable and rare metal, beryllium.

It has been found, however, that the use of alkali metals as the reducing agents under critical conditions permits operation of a different type of process in which there is a substantial separation of the chemical reduction step from the step wherein the massive metal or other product is formed, and whereby the chemical reduction step is carried out at any temperature above the melting point of the alkali metal and below the melting point of the corresponding alkali metal halides or of the melting point of the finely divided partially reduced mixture. For example, when reducing beryllium halides, nickel halides or silicon halides, such as the chlorides using sodium as the reducing agent, the reduction is carried out above the melting point of sodium and below the melting point of sodium chloride. It has been found that at these relatively low temperatures, the products of the reaction are free flowing, finely divided solids which consist of a mixture of the finely divided element, that is for instance, the beryllium, nickel, or silicon admixed with solid sodium chloride. In general, temperatures of reaction ranging from the melting point of the alkali metal up to the melting point of the by-product alkali metal halide or the melting point of the reaction mixture can be used. The preferred range is from about 150° C. up to about 400° C.

Although it is possible to produce, for example, a completely reduced finely divided powder consisting of the element and the by-product salt as the product of the stoichiometric reaction of the appropriate amounts of, for example, beryllium fluoride and sodium, the product having the composition, Be:2NaF, nickel chloride, and sodium, the produce having the composition Ni:2NaCl, or for example, silicon tetrachloride and sodium, the product having the composition Si:4NaCl, difficulties have arisen with the so-called stoichiometric process which difficulties are mentioned and further amplified hereinafter. Since the powder mixture of the completely reduced element and the by-product salt, is a relatively poor conductor of heat, it requires a relatively very long period of time, for instance, at least about 6 or 7 hours, to melt completely the salt in a sintering pot even as small as eighteen inches in diameter when heating the contents of the sintering vessel by external application of heat. Since agglomeration or heat treatment of the elemental particles to form massive and/or crystalline products does not proceed at an appreciable rate until the sodium halide by-product is molten, this heating up period represents wasted time and expense insofar as the heat treatment period itself is concerned. Thus, commercial size sintering pots having diameters up to six feet require completely impractical time periods because of the very large investment in expensive furnaces and sintering pots and the greatly increased heating costs. Although the time required to heat the contents of the sintering pot to the melting point of the alkali metal halide, for instance, sodium chloride, can be shortened somewhat by raising the temperature of the salt bath or other type furnaces used to heat the sintering pot, this is limited quite sharply by the upper limits of temperature to which practical materials of construction may be exposed, and particularly so when these materials are in contact with the very reactive materials.

A number of the major difficulties associated with the stoichiometric low temperature reduction process have been eliminated by the process of the invention described herein in which the reduction step is operated with a controlled deficiency of the alkali metal or, that is, a limited reduction level of the halide reactant and the additional required alkali metal is added prior to and/or during the sintering step for completing the reduction to the element and formation of the completely reduced product. By this method of operation, a number of advantages over other known reduction processes are obtained including advantages over the process for stoichiometric reduction in a single step.

This invention is applicable to the reduction of (1) halides of metals and non-metals having only one valence and (2) to halides of multivalent metals and multivalent non-metals in which halides the metal or non-metal component is at its lowest valence state, i.e., the first valence above the element in free form. Metals which may be prepared by the process of the invention described herein, include beryllium, cobalt, columbium (niobium), nickel, tantalum, thorium, zinc and palladium. The non-metals include boron and silicon. Of the multivalent metals, compounds such as titanium dichloride, cuprous chloride, ferrous chloride, zirconium dichloride, hafnium dichloride, uranium dichloride, manganous chloride and the like can be used, provided only that the metal is present in the halide in its lowest valent state next to the free element itself.

By operating with a controlled deficiency of the alkali metal in the reduction step, it is intended to mean that the alkali metal reducing agent is used in amounts at least sufficient to accomplish substantial but less than complete reduction of the starting halide to the corresponding metal or non-metal. The range of reduction level is preferably from 20% up to about 75–80%.

Thus, the reduction reaction of the halide may be carried out up to the desired reduction level, for instance, 20% reduction, 25% reduction, 50% reduction, 75% reduction, and up to about 75–80% reduction depending on the relative amount of sodium used in proportion to halide reactant. This is done most conveniently by critical control of the amount of alkali metal added. The only important requirement at this stage of the process is that the reaction product be an easily transportable, substantially solid powder which is relatively insensitive to temperature changes.

The partial reduction can be carried out using up to 75–80% of the theoretical alkali metal necessary for complete reduction to the metal and thus still retain a major portion of the advantages of the invention. Above about 85% reduction there is not sufficient heat released by the reaction of the relatively small proportion of remaining alkali metal to decrease the heat-up time of the sintering step to any marked degree, so that most of the heat advantages of the improved process are lost. Also in these reduction ranges relatively larger amounts of the starting halide reactant are completely reduced to metal and some of the disadvantages of stoichiometric reduction are present.

The amount of heat of reaction necessary to raise the temperature of the contents of the sintering pot to the melting point of sodium chloride can be determined. Table I gives some examples of reduction of various halides with sodium wherein the percentage of reduction in the second reduction stage necessary to raise the temperature of the mass from 200 to 800° C. is shown. Thus, for example, in the case of sodium reduction of boron trichloride, if 75% of the reduction is carried out in the first or low temperature step, the remaining reaction heat released on completing the reduction will raise temperature of the resulting mixture from 200 to 800° C. It may be desirable to have an additional release of heat in order to raise the temperature of the mass through the melting point of the by-product sodium chloride in which case the percentage of reduction in the second step would be increased to provide the additional heat required. Thus, the heat-up period can be varied to suit the individual compound being reduced and the heat requirements of the vessel being used as well as other operating conditions by supplying the correct amount of heat at the appropriate time.

TABLE I

*Table of heat requirements and corresponding reduction percentage*

| A | B | C |
|---|---|---|
| Reactions | Heat required to raise reaction products from 200 to 800° C. Kcal. per mol of product [1] [2] | Percent Reduction required in sintering step to satisfy heat requirements in Column B |
| $MnCl_2 + 2Na \rightarrow Mn + 2NaCl$ | 35.5 | 43.8 |
| $BCl_3 + 3Na \rightarrow B + 3NaCl$ | 48.75 | 25.0 |
| $NiCl_2 + 2Na \rightarrow Ni + 2NaCl$ | 35.5 | 29.4 |
| $SiCl_4 + 4Na \rightarrow Si + 4NaCl$ | 65.6 | 26.5 |
| $BeCl_2 + 2Na \rightarrow Be + 2NaCl$ | 34.85 | 47.0 |
| $CoCl_2 + 2Na \rightarrow Co + 2NaCl$ | 36.1 | 30.4 |
| $ThCl_4 + 4Na \rightarrow Th + 4NaCl$ | 67.7 | 62.0 |
| $ZnCl_2 + 2Na \rightarrow Zn + 2NaCl$ | 35.3 | 36.4 |
| $PdCl_2 + 2Na \rightarrow Pd + 2NaCl$ | 35.5 | 23.45 |

[1] Thermodynamic values for these calculations were obtained from the "Circular of the National Bureau of Standards 500."
[2] Heats of formation and heat capacity values used are at 298° K.

A highly important difficulty with commercial operation of the stoichiometric reduction process is that adequate means must be supplied for removal of heat in the relatively low temperature reduction step following which large quantities of heat must be supplied to raise the temperature of the finely divided reaction product to melt the by-product salt contained therein for the heat treating or sintering step. Using the herein described process in which a part of the reduction is carried out with the sintering step, the desired portion of the heat from the the reduction is very simply controlled and utilized in the sintering step with obvious and great economic and practical advantages. As the amount of sodium added to the sintering pot for stoichiometry becomes larger, the heat-up time for the charge decreases markedly. This reduction in heat-up time amounts to a tremendous saving in sintering time and very expensive furnacing equipment. Furthermore, this more efficient method of supplying and controlling heat internally makes the process independent of the size of the sintering equipment, i.e., a 40-inch diameter sintering vessel can be heated up as readily and as rapidly as a 10-inch pot.

The invention will be further described and illustrated by the following examples although it is not desired to limit the invention in any manner specifically thereto. All parts are by weight unless otherwise specified. While there are disclosed below but a limited number of embodiments of the invention herein presented, it is possible to produce still other embodiments without departing from the inventive concept herein disclosed, and it is desired therefore that only such limitations be imposed on the appended claims as are stated therein.

EXAMPLE 1

A charge of 200 parts of sodium chloride is added to the reduction vessel. During a period of about 1½ hours, 249 parts of manganous chloride and 45.5 parts of sodium are added continuously in proportionate amounts to the stirred salt bed. The temperature during the addition of reactants ranged from 185–260° C. This amount of sodium corresponds to the amount required for reduction of 50% of the total $MnCl_2$ added to the reduction vessel. An additional 45.5 parts of sodium to complete stoichiometric reduction is added to a mild steel sinter pot and the 50% reduction charge, after cooling, is transferred to the sintering vessel under an argon atmosphere. The entire charge is placed into an electric furnace and heated. At approximately 190° C. the remaining finely dispersed $MnCl_2$ is reduced by the molten sodium present with a resulting exothermic rise in temperature to 860° C. The pot and its contents are heated further to 900° C. for 4 hours and then removed from the furnace and allowed to cool to room temperature. A gray metal sponge containing sodium chloride is obtained from this sintering step. After crushing and leaching, 92 parts of finely divided light gray powder is recovered which analyzed 96.3% manganese. This is equivalent to an 82% yield.

EXAMPLE 2

A charge of 430 parts of thoroughly dried nickel chloride and 92 parts of sodium are added semi-continuously to a stirred bed of 300 parts of finely divided sodium chloride with the temperature being maintained between 225–300° C. The reaction gives a 60% reduction of the nickel chloride added. The black finely divided mixture containing nickel metal, nickel chloride and sodium chloride after cooling to room temperature is transferred to a sintering pot that contains 61 parts of sodium, an amount sufficient to complete the reduction of the remaining nickel chloride to nickel metal. The sintering pot and contents are placed in a 900° C. salt bath furnace. When the contents of the pot reach 223° C., the remaining nickel chloride is reduced by the sodium metal whereby sufficient heat is released from the reaction to raise the temperature of the contents to 890° C. in less than 15 minutes. The charge is then heated for 4½ hours at 900° C. The dark gray salt saturated metal sponge is removed from the cooled sintering pot, crushed, and leached with water to remove salt. 182 parts of 95.8% nickel is recovered, which corresponds to an 89.5% yield.

EXAMPLE 3

On a stirred bed of 300 parts of sodium chloride, 246 parts of beryllium chloride and 70.9 parts of sodium are reacted between 300–400° C. by continuous addition of reactants to give a finely divided reduction product of beryllium metal, beryllium chloride and sodium chloride containing equimolar amounts of beryllium and beryllium chloride. The 50% reduction product is then transferred under an inert atmosphere of argon to a stainless steel sinter vessel which has been charged with 70.9 parts of sodium to complete the reduction. On heating the charge, the remaining portion of the reduction was started at 280° C., giving a rapid temperature rise of the charge to 805° C., the fusion temperature of the by-product NaCl. Heating is continued at 900° C., for 5 hours. The sinter containing salt and metal sponge is leached with water and yields 25 parts of 93.5% beryllium metal which is equivalent to an 84% yield.

EXAMPLE 4

A stoichiometric reduction of 204 parts of boron trichloride vapor is carried out by continuous addition on a stirred bed of 300 parts of NaCl between 300–400° C. using 120 parts of sodium. An additional 80 parts of sodium is added to the stirred bed giving a heavy powdered mixture which is transferred to a stainless steel sinter pot. To the sinter pot at room temperature an additional 136 parts of boron trichloride is added as liquid and the entire unit sealed off and heated. At 155° C., a reaction occurs that raises the temperature of the contents to 922° C. Heating at 900° C. is continued for 3 hours and after cooling, a black briquette is removed from the pot. This briquette is crushed and leached to remove salt and some excess sodium present. 29 parts of dark brown, fluffy powder is recovered from the vacuum drying treatment and analyzed as 94.3% boron and 4.2% iron, which indicates that some alloy formation occurs during the sinter step. Of the available boron 87% is recovered.

EXAMPLE 5

A charge of 227 parts of cobaltous chloride and 40.3 parts of sodium metal are added semi-continuously to an agitated bed of 300 parts of NaCl the temperature being maintained at 240–300° C. The reaction proceeds readily in this temperature range. The free flowing reduction product corresponding to a 50% reduction of the cobaltous chloride to cobalt metal is then transferred under an argon atmosphere to a sinter pot which contains 40.3 parts of sodium or sufficient to reduce the remaining cobaltous chloride. The sinter vessel with its contents is then placed in a 900° C. salt bath furnace and when the contents reach 247° C., the remaining reactants are combined to give an immediate increase in temperature to 867° C. Following an additional 5 hours of heating at 910° C., the sinter vessel is removed and tilted so that the salt is drained from the metal. 97 parts of 95.3% cobalt metal or a 90% yield is recovered as a coarse powder, following the leaching and drying operations.

EXAMPLE 6

The reduction vessel is charged with 200 parts of sodium chloride as a solid reaction medium. Over a period of 3 hours, 60 parts of silicon tetrachloride and 65 parts of sodium are added thereto with agitation in a temperature range of 140 to 240° C., which is maintained by regulating rate of addition of reactants. This mixture, after cooling to room temperature, is transferred to a mild steel sintering vessel which contains 29 parts of sodium. Twenty-five parts of silicon tetrachloride are added to the contents of the sintering vessel. The vessel and contents are then heated in a furnace. At about 125° C. the free silicon tetrachloride and sodium reacts with a release of heat which carries the internal temperature in the pot up to 890° C. Temperature of the contents is maintained at 900° C. for an additional four hours. The vessel and contents are removed from the furnace and allowed to cool to room temperature. The pot is opened and contents removed. The silicon is recovered as a light gray powder after leaching with water to remove sodium chloride by-product. Yield is 11.2 parts or 80% of theory.

While there is above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. The process for the production of a chemical element selected from the group consisting of beryllium, cobalt, columbium, nickel, tantalum, thorium, zinc, palladium, titanium, copper, iron, zirconium, hafnium, uranium, manganese, boron and silicon, which comprises (A) reacting at least one halide of the chemical element, in which the chemical element is at its lowest valency state as a halide, with about 20 to 80% of the amount of an alkali metal stoichiometrically required to reduce said halide to the element, at a temperature above the melting point of said alkali metal but below the melting point of any of the reaction products, to form a solid, finely divided mixture of halides and chemical element, (B) reacting said solid, finely divided mixture with an additional amount of alkali metal stoichiometrically sufficient to reduce the reducible halides remaining in said mixture to form the corresponding chemical element and alkali metal halide, and utilizing the resulting heat of reaction in heating the reaction product mixture to a temperature above the melting point of the alkali metal halide.

2. The process of claim 1 wherein said alkali metal is sodium.

3. The process of claim 1 wherein said temperature above the melting point of said alkali metal but below the melting point of any of the reaction products is within the range of about 150° to 400° C.

4. The process of claim 1 wherein said chemical element has only one valence as a halide.

5. The process of claim 1 wherein the reaction product mixture is heated at a temperature sufficient to sinter said chemical element, and then isolating the chemical element from said mixture.

6. The process for the production of a chemical element selected from the group consisting of beryllium, cobalt, columbium, nickel, tantalum, thorium, zinc, palladium, titanium, copper, iron, zirconium, hafnium, uranium, manganese, boron and silicon, which comprises (A) reacting at least one halide of the chemical element, in which the chemical element is at its lowest valency state as a halide, with about 20 to 80% of the amount of sodium stoichiometrically required to reduce said halide to the element, at a temperature within the range of about 150° to 400° C., to form a solid, finely divided mixture of halides and chemical element, (B) reacting said solid, finely divided mixture with an additional amount of sodium stoichiometrically sufficient to reduce the reducible halides remaining in said mixture to form corresponding chemical element and sodium halide, and utilizing the resulting heat of reaction in heating the reaction product mixture to a temperature above the melting point of the sodium halide.

7. The process of claim 6 wherein said chemical element has only one valence as a halide.

8. The process of claim 6 wherein the reaction product mixture is heated at an elevated temperature sufficient to sinter said chemical element, and then isolating the chemical element from said mixture.

References Cited in the file of this patent

UNITED STATES PATENTS

| | | |
|---|---|---|
| 524,172 | Jacques | Aug. 7, 1894 |
| 1,306,568 | Weintraub | June 10, 1919 |
| 2,172,969 | Eringer | Sept. 28, 1936 |
| 2,465,989 | Sowa | Apr. 5, 1949 |
| 2,685,501 | Spevack | Aug. 3, 1954 |